2,741,324

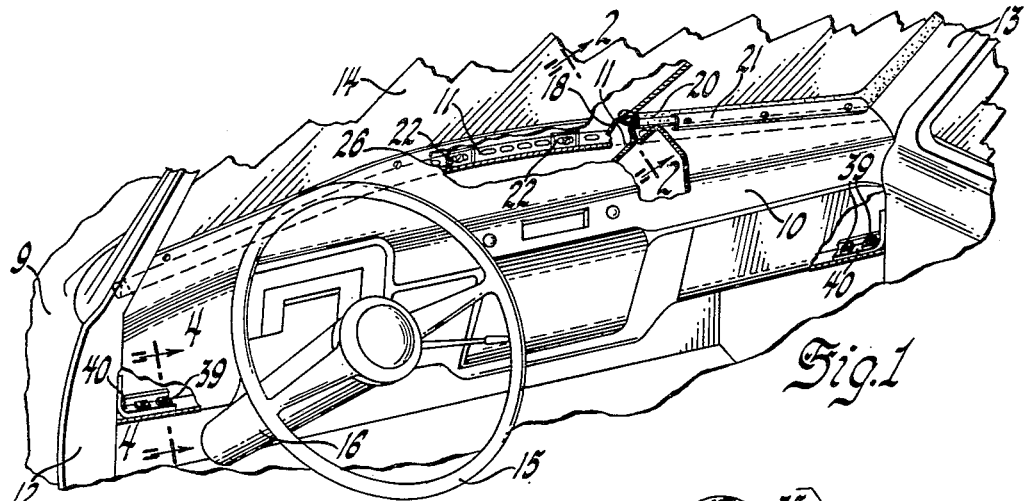
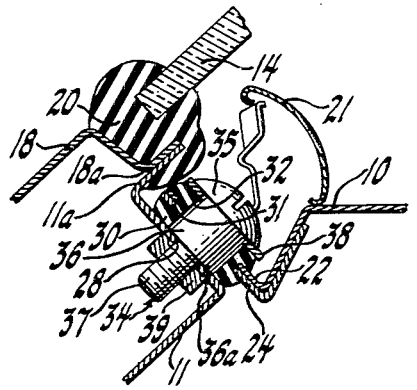
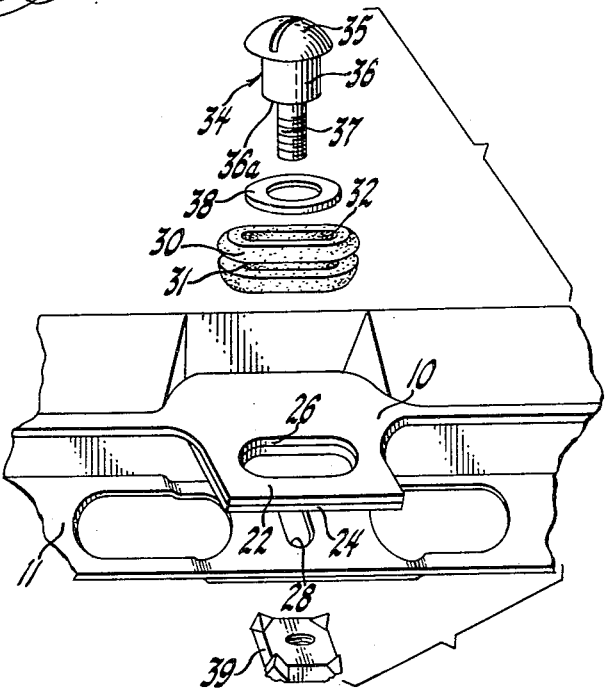
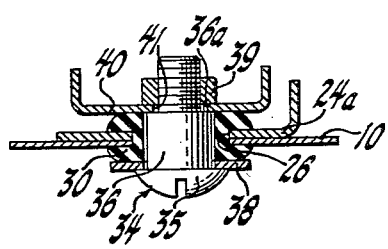
April 10, 1956 R. R. ANDERSON 2,741,324
INSTRUMENT PANEL MOUNTING MEANS
Filed Nov. 1, 1952
Fig.1
Fig.2
Fig.3
Fig.4
Inventor
Ralph R. Anderson
By Willis, Helwig & Baillio
Attorneys United States Patent Office 2,741,324
Patented Apr. 10, 1956

INSTRUMENT PANEL MOUNTING MEANS

Ralph R. Anderson, Detroit, Mich., assignor to General Motors Corporation, Detroit, Mich., a corporation of Delaware Application November 1, 1952, Serial No. 318,302

11 Claims. (Cl. 180—90)

This invention relates to instrument panel mounting means, and more particularly to a mounting means whereby the instrument panel is cushioned from the automobile body so that it is not subject to vibrations and shocks incidental to the operation of the automobile, but at the same time the panel is firmly mounted on the body.

In the past it has been conventional to mount the instrument panel in rigid association with the automobile body, the instrument panel body portion being carried by a windshield frame, and the ends of the panel being mounted on the door pillars. When such a rigid mounting is employed the instrument panel is subject to shocks and vibrations which are incidental to the operation of the vehicle, and these shocks and vibrations may have a detrimental effect on the instruments on the panel. Merely mounting the panel on resilient blocks is not satisfactory, because this provides a "soft" mounting wherein the instrument panel is not firm, whereas a rigid mounting is desired, but one which still is cushioned from body shocks and vibrations.

The invention provides a novel instrument panel mounting means wherein the instrument panel is firmly mounted on the body, yet is isolated from body shocks and vibrations.

Other features and advantages of the invention will be apparent from the following description and from the drawings, in which:

Fig. 1 is a perspective view of a portion of the inside of an automobile with parts of the instrument panel broken away to show underlying structure;

Fig. 2 is a fragmentary transverse section through a portion of the windshield frame and the instrument panel taken along the line 2—2 of Fig. 1, showing how the body portion of the instrument panel is mounted on the windshield frame;

Fig. 3 is an exploded view of the mounting means of Fig. 2; and

Fig. 4 is a section taken along the line 4—4 of Fig. 1 showing how one end of the instrument panel is mounted on the door pillar.

Referring now more particularly to the drawings, an automobile body 9 has an elongated instrument panel 10 with its main or body portion mounted on a windshield frame 11, and its opposite ends mounted on spaced door pillars 12 and 13. The windshield frame 11 extends transversely of the automobile body between the pillars 12 and 13 and supports a windshield 14. While instruments may be carried on the instrument panel 10 throughout its entire length, most of the instruments are usually clustered forwardly of the steering wheel 15 which is mounted on a steering column 16.

The means by which the body portion of the instrument panel is mounted on the windshield frame are shown best in Figs. 2 and 3. The windshield frame 11 has at its upper edge an upwardly turned flange 11a which engages an upwardly turned flange 18a on a cowl shroud member 18, the flanges 11a and 18a being received in an elongated slot in a rubber windshield mounting channel member 20 which supports the windshield 14. This channel member and the instrument panel mounting means are substantially concealed by a trim strip 21, as shown in Figs. 1 and 2.

Referring to Figs. 1 and 3, the instrument panel 10 is provided with a plurality of spaced projecting flanges 22 on the under side of which are reinforcing members 24, each flange 22 and reinforcing member 24 having an elongated opening 26 so located that its longest dimension extends in a direction generally transversely of the automobile body. As shown in Fig. 3, the windshield frame 11 is provided with elongated openings 28, there being a plurality of spaced openings 28, each of which is aligned with one or the panel openings 26 and each of which extends substantially at right angles to the associated panel opening.

An elongated grommet 30 of rubber or other resilient material is positioned in each of the panel openings 26, each grommet having an annular groove 31 seating the edge portion of the instrument panel around the panel opening 26, and each grommet having an elongated aperture 32 therethrough wider than the support opening 28, the openings 28 being of lesser width than the panel openings 26 as shown clearly in Fig. 3. A plurality of fastening devices are provided, each comprising a shoulder bolt designated generally as 34 having a head portion 35, a shank 36 providing a shoulder 36a, and a threaded end portion 37. The threaded end 37 is of lesser diameter than the width of the support openings 28, and the shank 36 is of slightly lesser diameter than the width of the panel openings 26. A washer 38 is provided for engagement with the under surface of the head 35 of the bolt to provide a large surface for abutting the associated grommet and the bolt engages a weld nut 39 welded to the under side of flange 11a of windshield frame 11.

Fig. 2 and the exploded view of Fig. 3 show the relationship of the parts. One of the grommets 30 is mounted in each of the panel openings (see Fig. 2), each grommet having an annular groove seating the edge portion of the panel around the opening 26, and the shoulder bolt 34 (having the washer 38 mounted on its shank) is placed through the aperture 32 in the grommet and through the support openings 28, the bolt engaging a nut 39 which is welded to the under surface of frame 11. When the shoulder bolt 34 is tightened the grommet 30 is compressed as shown in Fig. 2, since the shank portion between the washer 38 and the shoulder 36a is shorter than the thickness of the grommet 30 when the grommet is not under compression. In a preferred construction the grommet has a free or uncompressed thickness of ½ inch and the distance between the under surface of the washer 38 and the shoulder 36a is of the order of 5/16 inch.

The provision of a mounting wherein the resilient grommet is compressed and wherein the under surface of the washer 38 abuts the grommet and the shoulder 36a is seated on the support means when the grommet is under compression provides a firm mounting for the instrument panel lacking the "softness" which would be present if the mounting were fastened merely by means of a rubber block or cushioning member. At the same time, the connection between the windshield frame and the instrument panel is through the resilient grommets 30, so that a cushioned or isolated mounting is provided for the instrument panel, and body vibrations are not transmitted to the instrument panel.

Referring to Figs. 1 and 4, adjacent each end of the instrument panel a door pillar support bracket 40 is provided, each support bracket being mounted on one of the door pillars 12 or 13, and each support bracket having openings 41 which may be similar to the support openings 28 in the windshield frame, although preferably the openings 41 in the support bracket are circular in shape. The instrument panel 10 is provided with reinforcing members 24a, and elongated openings 26 extend through panel 10 and bracket 24a. The mounting means is similar to that described in connection with Figs. 2 and 3, a grommet 30 being positioned in each opening in the instrument panel, and a shoulder bolt 34 projecting through the grommet and through the pillar support bracket 40, the bolt having a shoulder 36a which seats on the bracket 40 when the grommet 30 is under compression to provide a rigid mounting, yet one which cushions or isolates the instrument panel.

While I have shown and described one embodiment of my invention, it is subject to many modifications. Changes, therefore, in the construction and arrangement may be made without departing from the spirit and scope of the invention as set forth in the appended claims.

I claim:

1. Instrument panel mounting means of the character described, including: an instrument panel having a plurality of spaced openings; a grommet of resilient material disposed in each opening, each grommet having an annular groove seating the edge portion of said panel around the opening; panel support means; and fastening means projecting through each grommet and through said support means for mounting said panel on said support means, the grommets being compressed by the fastening means and the fastening means having an integral shoulder surface seating on the support means when the grommet is compressed.

2. Instrument panel mounting means of the character described, including: an instrument panel having a plurality of spaced openings comprising a first group of openings; a grommet of resilient material disposed in each of said openings, each grommet having an annular groove seating the edge portion of said panel around the opening; panel support means having a plurality of openings comprising a second group of openings, a different one of which is aligned with each one of the panel openings, the openings in said support being of smaller size than said panel openings; and a plurality of fastening devices each projecting through a grommet and through a support opening for mounting said panel on said support means, the grommets being compressed by the fastening devices and each fastening device having an integral shoulder seating on said support means when the associated grommet is under compression.

3. Apparatus of the character claimed in claim 2, wherein at least one of said groups of openings is elongated to facilitate assembly of the parts.

4. Apparatus of the character claimed in claim 2 wherein the panel openings and at least some of the support openings are elongated, the elongated panel openings extending substantially at a right angle to the elongated support openings.

5. Instrument panel mounting means of the character described, including: an instrument panel having a plurality of spaced elongated openings, an elongated grommet of resilient material disposed in each of said panel openings, each grommet having an annular groove seating the edge portion of said panel around the panel opening; panel support means having a plurality of openings, a different one of which is aligned with each one of the panel openings, and at least some of which are elongated and extend substantially at right angles to the associated panel opening, the support openings being of lesser width than the panel openings; and a plurality of fastening devices each projecting through a grommet and through a support opening for mounting said panel on said support means, the grommets being compressed by the fastening devices and each fastening device having means providing a surface abutting the associated grommet and a shoulder surface seating on said support means when the grommet is under compression.

6. Apparatus of the character claimed in claim 5, wherein each fastening device comprises a shoulder bolt having a shank portion shorter than the thickness of each grommet when the grommet is not under compression and providing a shoulder seating on said support means when the grommet is compressed.

7. Apparatus of the character claimed in claim 5, wherein each grommet has an elongated aperture therethrough wider than the associated support opening and wherein each fastening device comprises a shoulder bolt having a shank portion shorter than the thickness of each grommet when the grommet is not under compression and of a diameter slightly less than the width of said aperture, said shank providing a shoulder seating on said support means when the grommet is compressed.

8. Instrument panel mounting means of the character described, including: an elongated instrument panel having a plurality of spaced elongated openings; first panel support means comprising a windshield frame for supporting the body of said panel, said frame having a plurality of elongated openings each of which is aligned with one of the panel openings and extends substantially at right angles to the associated panel opening, the support openings being of lesser width than the panel openings; second panel support means comprising spaced door pillar members for supporting the ends of said panel, said pillar members having openings each aligned with one of the panel openings; an elongated grommet of resilient material disposed in each of said panel openings, each grommet having an annular groove seating the edge portion of said panel around said panel opening, and each grommet having an elongated aperture therethrough wider than said support openings; and a plurality of fastening devices each comprising a shoulder bolt projecting through the aperture in a grommet and through a support opening for mounting said panel on said windshield frame and door pillars, the grommets being compressed by the bolts, each bolt having means providing a surface abutting the associated grommet and a shank providing a shoulder seating on said support means when the grommet is under compression, the shank of each bolt being shorter than the thickness of each grommet when the grommet is not under compression and of a diameter slightly less than the width of said aperture.

9. Instrument panel mounting means of the character described, including: an instrument panel having a plurality of spaced elongated openings; panel support means having a plurality of openings, a different one of which is aligned with each one of the panel openings, and at least some of which are elongated and extend substantially at right angles to the associated panel opening, the support openings being of lesser width than the panel openings; an elongated grommet of resilient material positioned in each of said panel openings, each grommet having an annular groove seating the edge portion of said panel around said panel opening; and a plurality of fastening devices each comprising a shoulder bolt projecting through a grommet and through said support means for mounting said panel on said support means, the grommets being compressed by the bolts, each bolt having a surface abutting the associated grommet and a shank providing a shoulder surface seating on said support means when the grommet is under compression, the shank of each bolt being shorter than the thickness of each grommet when the grommet is not under compression.

10. Apparatus of the character described, including: an automobile body having a structural member across the front comprising instrument panel support means; an instrument panel having a plurality of spaced openings; a grommet of resilient material disposed in each opening, each grommet having an annular groove seating the edge portion of said panel around the opening; and fastening means projecting through each grommet and through said support means for mounting said panel on said support means, the grommets being compressed by the fastening means and the fastening means having an integral shoulder surface seating on the support means when the grommet is compressed.

11. Apparatus of the character described, including: an automobile body having a structural member across the front and a door pillar at each side, said member and pillars comprising instrument panel support means; an instrument panel having a plurality of spaced openings; a grommet of resilient material disposed in each opening, each grommet having an annular groove seating the edge portion of said panel around the opening; and fastening means projecting through each grommet and through said support means for mounting said panel on said support means, the grommets being compressed by the fastening means and each fastening means having an integral surface abutting the associated grommet for compressing the same and an integral shoulder surface seating on said support means when the grommet is under compression.

References Cited in the file of this patent

UNITED STATES PATENTS

| | | |
|---|---|---|
| 1,727,632 | Champion | Sept. 10, 1929 |
| 1,783,920 | Keeney | Dec. 2, 1930 |
| 1,789,109 | Moesta | Jan. 13, 1931 |
| 1,892,943 | Geyer | Jan. 3, 1933 |
| 2,328,518 | Wahlberg et al. | Aug. 31, 1943 |
| 2,367,449 | Triplett | Jan. 16, 1945 |

FOREIGN PATENTS

| | | |
|---|---|---|
| 521,462 | Great Britain | May 22, 1940 |